United States Patent [19]

Dausch

[11] Patent Number: 5,198,025
[45] Date of Patent: Mar. 30, 1993

[54] PREPARATION OF METAL OXIDE-DOPED ZINC OXIDE PIGMENTS

[75] Inventor: Wilma M. Dausch, Limburgerhof, Fed. Rep. of Germany

[73] Assignee: BASF Aktiengesellschaft, Ludwigshafen, Fed. Rep. of Germany

[21] Appl. No.: 762,371

[22] Filed: Sep. 19, 1991

[30] Foreign Application Priority Data

Oct. 20, 1990 [DE] Fed. Rep. of Germany ....... 4033417

[51] Int. Cl.$^5$ .............................................. C04B 14/00
[52] U.S. Cl. ................... 106/429; 106/419; 106/425
[58] Field of Search ............... 106/419, 422, 424, 425, 106/429

[56] References Cited

U.S. PATENT DOCUMENTS

| | | | |
|---|---|---|---|
| 2,028,980 | 1/1936 | Korinth et al. | 134/78 |
| 2,579,020 | 12/1951 | Smith | 106/288 |
| 2,887,632 | 5/1959 | Dalton | 317/238 |
| 3,264,229 | 8/1966 | Klein | 252/518 |
| 5,094,693 | 3/1992 | Cordaro et al. | 106/425 |

FOREIGN PATENT DOCUMENTS 589783 12/1933 Fed. Rep. of Germany .
931155 2/1948 France .

*Primary Examiner*—Karl Group
*Assistant Examiner*—Chris Gallo
*Attorney, Agent, or Firm*—Oblon, Spivak, McClelland, Maier & Neustadt

[57] ABSTRACT

Metal oxide-doped zinc oxide pigments are produced by processing an oxide, carbonate, hydroxide of hydroxycarbonate of zinc in the presence of water and an oxide, carbonate, hydroxide, hydroxy-carbonate, oxalate or formate of the doping metal into a paste using formic acid or oxalic acid in an amount which is at least sufficient for converting the oxides, carbonates, hydroxides or hydroxycarbonates mentioned into formates or oxalates, drying, grinding and calcining at from 700° to 1100° C. in an inert gas atmosphere.

4 Claims, No Drawings

PREPARATION OF METAL OXIDE-DOPED ZINC OXIDE PIGMENTS

The present invention relates to a process for preparing metal oxide-doped zinc oxide pigments which, depending on the doping metal, have different colors.

Doped zinc oxide pigments have been described in U.S. Pat. No. 2,028,980. The pigments are prepared by heat treating a mixture of the oxides while taking care to ensure that the coloring metal oxide is present in the oxidation state MeO. In the case of metals in a higher oxidation state, therefore, the calcination is carried out under such conditions that the MeO state is not departed from, either in the upward or downward direction. Instead of the oxides themselves it is of course also possible to start from suitable compounds of the metals which, by thermal dissociation during the calcination, can be converted into the oxides. The corresponding metal sulfates are mentioned as particularly suitable on account of their high decomposition temperature.

In one version of this process, described in DE Patent 589,783, the corresponding metal nitrates or carbonates are also used. For instance, first the carbonates are precipitated from the sulfates of zinc and manganese in aqueous solution, reduced at 700° C. in a $CO/CO_2$ stream and then calcined in a deoxygenated stream of nitrogen at 900° C.

The preparation of metal oxide-doped zinc oxide pigments from oxide or salt mixtures is not unproblematical, despite the simple procedure of mixing and calcining. Formation of homogeneous mixed phases requires that atoms or ions diffuse across grain boundaries into the crystal lattice of the cocomponent and possibly form new structures there. This process takes time and very frequently also requires high temperatures, even if facilitated by intensive mixing of the starting materials and by the use of very finely crystalline substances. Owing to the high temperatures and the long duration, moreover, undesirable grain growth takes place, so that the pigments have little hiding power and are unsuitable for use as colorants.

A uniform distribution of the atoms in a common crystal lattice can be obtained by precipitating sparingly soluble compounds from solutions which contain all components in homogeneous dispersion. Oxidic mixed crystals can thus be prepared in two stages via the precipitation of a suitable starting compound, which is then converted to the oxide at elevated temperature.

Although the precipitation of a precursor has the incidental advantage of thorough and easily achieved mixing of the starting substances, the method also has disadvantages. The mother liquor, usually water, is not necessarily reusable and always contains residual amounts of inorganic salts, frequently of heavy metals, which, following removal in a water treatment plant, take up the scarce resources of special waste landfills. To remove any troublesome salts which have been coprecipitated, the filter cakes must be washed salt-free with clean water—again a costly option.

Inorganic pigments where the color is due to the incorporation of ions with d- and f-electrons into an inherently colorless host lattice are particularly sensitive to fluctuations in the production conditions. Too low a calcining temperature, poor mixing of the starting materials and short calcining times can lead to inhomogeneities of the product which reduce the color quality. If the color of a pigment is due to the incorporation of ions which are oxidizable, e.g. manganese, then the color properties may also deteriorate on contact with oxygen. In the production process, care must be taken to ensure that the oxidation numbers of the incorporated metal atoms are preserved or, if they have gone up, are brought back down.

In the case of manganese-doped zinc oxides, the pigment color is due to the incorporation of manganese(II) oxide, the color ranging from yellow to red depending on the manganese content. If the oxidation number of the manganese is higher, the chroma suffers. At the extreme, only colors ranging from olive green to brown are obtained.

All prior art processes for producing doped zinc oxides suffer from the abovementioned defects.

It is an object of the present invention to find a method of production which makes it possible on the one hand to synthesize coloristically pure metal oxide-doped zinc oxides in a reproducible manner but where on the other hand virtually no difficult-to-treat liquid or gaseous wastes are emitted.

We have found that this object is achieved by a process for preparing metal oxide-doped zinc oxide pigments which comprises processing the oxides, carbonates, hydroxides and/or hydroxycarbonates of zinc in the presence of water and oxides, carbonates, hydroxides, hydroxycarbonates, oxalates or formates of the doping metals into a paste using formic acid and/or oxalic acid in an amount which is at least sufficient for converting the mentioned oxides, carbonates, hydroxides and/or hydroxycarbonates into formates or oxalates, drying, grinding and calcining at from 700° to 1100° C. in an inert gas atmosphere.

Possible metal oxides with which zinc oxide can be doped are in particular the divalent oxides of calcium, iron, manganese, magnesium, cobalt and nickel.

The process of the present invention can be carried out by reacting the oxide, hydroxide, carbonate and/or hydroxycarbonate of divalent zinc and the corresponding compounds of the divalent doping metals in the presence of water with formic acid and/or oxalic acid to give the corresponding formates and/or oxalates. The amount of water present therein is determined in such a way that the mixture has a pasty consistency. In general, this is the case with water contents of from 20 to 45% by weight, based on the other materials used. The reaction can be carried out at from 10° to 90° C. The acids are used at least in such amounts as are stoichiometrically necessary for converting the metal compounds used into the corresponding oxalates or formates. An excess of acid beyond the stoichiometrically required amount is not deleterious, but should advantageously not exceed 10%.

In a further version of the process of the present invention, it is also possible to proceed stepwise by reacting the oxides, carbonates, hydroxides and/or hydroxycarbonates of the divalent doping metals with formic acid and/or oxalic acid in the presence of water and then introducing the zinc compounds into the resulting solution and reacting the mixture.

No filtration or washing of the product obtained in the first stage is necessary, since the amounts of water used are small and the reaction, in addition to the metal formates or oxalates, gives rise only to compounds which in the course of the subsequent drying or calcination will anyhow be expelled from the reaction mixture.

After the reaction, the paste formed is dried. Since the oxalates or formates formed are not oxidationsensitive, the drying can be carried out in air.

The drying is customarily carried out at from 50° to 100° C. Following the drying operation, the product is ground and finally calcined at from 700° to 1100° C. in an inert gas atmosphere, such as a nitrogen or carbon dioxide stream. There is no need to add a reducing agent, since the formates or oxalates themselves have a reducing action and consequently there is no undesirable oxidation of the divalent doping metal oxides.

The pigments produced according to the present invention are suitable for coloring plastics. Owing to their high temperature stability they can be used in particular for coloring plastics which are processed at above 280° C.

EXAMPLE 1

Cobalt-doped zinc oxide 228.24 g of zinc hydroxide carbonate were mixed with 10.02 g of cobalt hydroxide carbonate in a Turbula mixer for 30 minutes. The ready-produced mixture was added to a mixture of 277.4 g of oxalic acid dihydrate and 277.7 g of water in the course of about 15 minutes. After stirring for 60 minutes, the resulting paste was dried at 50° C. in a through-circulation cabinet, ground and calcined at 950° C. under nitrogen for one hour. The product was a deep green pigment.

EXAMPLE 2

Iron(II)-doped zinc oxide 126.99 g of an FeOOH suspension (3.52% by weight of iron) were admixed with 548.40 g of water and 653.03 g of oxalic acid, and the suspension was heated to 90° C. with stirring. 465.98 g of zinc hydroxide carbonate were added to the green solution in the course of 20 minutes and the solution was subsequently stirred for 60 minutes. The ready-produced paste was dried at 60° C., ground and calcined at 800° C. under nitrogen for one hour. The product was a yellowish green pigment.

EXAMPLE 3

Magnesium/manganese-doped zinc oxide 276.82 g of zinc oxide, 48.84 g of manganese carbonate and 20.25 g of magnesium hydroxide carbonate were mixed with one another in a Turbula mixer and then added to a suspension of 554.7 g of oxalic acid dihydrate and 300 g of water in the course of 60 minutes. After stirring for 60 minutes, the ready-produced paste was dried at 60° C., ground and then calcined at 950° C. under nitrogen for one hour. The product was a bright yellowish orange pigment.

EXAMPLE 4

Manganese-doped zinc oxide 427.95 g of zinc hydroxide carbonate and 48.84 g of manganese carbonate were mixed in a Turbula mixer for 30 minutes. The ready-produced mixture was added with stirring to a mixture of 554.7 g of oxalic acid dihydrate and 550.0 g of water in the course of about 40 minutes. After stirring for 30 minutes, the ready-produced paste was dried at 60° C. in a vacuum drying cabinet, ground and then calcined at 950° C. under nitrogen for 1 hour. The product was an orange pigment.

COMPARATIVE EXAMPLE 1

100.0 g of $ZnSO_4.7H_2O$ and 6.53 g of $MnSO_4.H_2O$ were ground together and then calcined at 950° C. for 15 minutes. The product was then calcined in a stream of 50% by volume of CO and 50% by volume of $CO_2$ for 45 minutes. The product was reddish brown, coloristically unattractive and inhomogeneous.

COMPARATIVE EXAMPLE 2

431.31 g of $ZnSO_4.7H_2O$ and 28.14 g of $MnSO_4.4H_2O$ were dissolved in 1 l of distilled water and precipitated with 295.9 g of $NH_4CO_3$. This is followed by 15 minutes of stirring. The precipitated carbonate was filtered off with suction, washed sulfate-free with 15 l of distilled water, but the filter cake was rock hard and had to be loosened and stirred up in between. The precipitated product was dried at 60° C. for 2 hours, ground, then reduced at 700° C. in a stream of 50% by volume of CO and 50% by volume of $CO_2$ for 1 hour and thereafter treated at 950° C. for 1 hour. The product was an orange pigment.

The mother liquor contained 520 mg/kg of zinc, 18 mg/kg of manganese, 103 g/kg of sulfate and 52 g/kg of ammonia. After 5 l of wash water had been consumed, the filtrate contained 800 mg/kg of zinc, less than 3 mg/kg of manganese, 1.2 g/kg of sulfate and 4.4 g/kg of ammonia, and after 10 l of wash water less than 3 mg/kg of zinc and manganese, 9 mg/kg of sulfate and 250 mg/kg of ammonia. Both mother liquor and wash water need to be worked up before they can be disposed of.

We claim:

1. A process for preparing a metal oxide-doped zinc oxide pigment, which comprises processing an oxide, carbonate, hydroxide or hydroxycarbonate of zinc in the presence of water and an oxide, carbonate, hydroxide, hydroxycarbonate, oxalate or formate of a doping metal into a paste using formic acid or oxalic acid in an amount which is at least sufficient for converting the oxides, carbonates, hydroxides or hydroxycarbonates mentioned into formates or oxalates, drying, grinding and calcining at from 700° to 1100° C. in an inert gas atmosphere.

2. A process as claimed in claim 1, wherein the doping metal compound used is a compound of divalent iron, manganese, cobalt, nickel, calcium or magnesium.

3. A process as claimed in claim 1, wherein the processing into a paste is carried out at from 10° to 90° C.

4. A process as claimed in claim 1 wherein the formic or oxalic acid is used in an excess of up to 10% relative to the stoichiometrically required amount.

* * * * *